(12) United States Patent
Moyal et al.

(10) Patent No.: US 11,200,045 B1
(45) Date of Patent: Dec. 14, 2021

(54) DIGITAL TWIN ENABLED ASSET PERFORMANCE AND UPGRADE MANAGEMENT

(71) Applicant: International Business Machines Corporation, Armonk, NY (US)

(72) Inventors: Shailendra Moyal, Pune (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/071,253

(22) Filed: Oct. 15, 2020

(51) Int. Cl.
| | | |
|---|---|---|
| *G06F 9/44* | (2018.01) |
| *G06F 8/65* | (2018.01) |
| *G06F 8/61* | (2018.01) |
| *G06F 11/34* | (2006.01) |
| *H04L 29/06* | (2006.01) |
| *G06F 11/30* | (2006.01) |

(52) U.S. Cl.
CPC .................. *G06F 8/65* (2013.01); *G06F 8/63* (2013.01); *G06F 11/3006* (2013.01); *G06F 11/3409* (2013.01); *G06F 11/3438* (2013.01); *G06F 11/3442* (2013.01); *H04L 67/42* (2013.01)

(58) Field of Classification Search
None
See application file for complete search history.

(56) References Cited

U.S. PATENT DOCUMENTS

| 9,639,341 B2 * | 5/2017 | Freiter ...................... G06F 8/65 |
| 10,564,993 B2 | 2/2020 | Deutsch |
| 2018/0335907 A1 * | 11/2018 | Mohan ..................... G06F 30/00 |
| 2019/0138333 A1 * | 5/2019 | Deutsch .............. G06F 9/45516 |
| 2019/0354922 A1 * | 11/2019 | Berti ..................... G06Q 10/087 |
| 2020/0250683 A1 * | 8/2020 | Padmanabhan ......... G06F 9/451 |

OTHER PUBLICATIONS

Anonymous et al., "Device compatibility overview", Android Developers, Mar. 19, 2020, 8 Pages.
Anonymous et al., "Gartner Survey Reveals Digital Twins Are Entering Mainstream Use", Gartner Inc., Stamford, Connecticut, USA, Feb. 20, 2019, 3 Pages.
(Continued)

*Primary Examiner* — Qamrun Nahar
(74) *Attorney, Agent, or Firm* — Donald G. Weiss

(57) ABSTRACT

In an approach to digital twin enabled asset performance and upgrade management, upcoming changes for assets are received, where the upcoming changes include at least one of hardware requirements, firmware requirements, software requirements, hardware upgrades, firmware upgrades, and software upgrades. The upcoming changes for the assets are stored into repositories, where the appropriate repository is determined using topic modeling. The digital twins are updated, where each digital twin is continuously updated with the upcoming changes. Continued usage metrics are calculated for each asset based on the output of the digital twins, where the continued usage metrics are specific to each asset. A report is created based on the upcoming changes and the continued usage metrics, where the report includes at least one of hardware dependencies, firmware dependencies, software dependencies, and upgrade dependencies.

20 Claims, 6 Drawing Sheets

(56) References Cited

OTHER PUBLICATIONS

Anonymous et al., "IBM Maximo Asset Performance Management", IBM, Jul. 30, 2020, 3 Pages.
Borodulin et al., "Towards Digital Twins Cloud Platform: Microservices and Computational Workflows to Rule a Smart Factory", UCC 17, Proceedings of the 10th International Conference on Utility and Cloud Computing, Austin, TX, USA, Dec. 5-8, 2017, 3 Pages.
Haslam, Karen, "Apps incompatible with Mojave: Apple, Adobe, Microsoft", Macworld, United Kingdom, May 17, 2019, 6 Pages.
Mell et al., "The NIST Definition of Cloud Computing", National Institute of Standards and Technology, Special Publication 800-145, Sep. 2011, 7 pages.
Neelam et al., "Is Your Organization Ready to Embrace a Digital Twin?", Cognizant, 2018, 24 Pages.

\* cited by examiner

DIGITAL TWIN ENABLED ASSET PERFORMANCE AND UPGRADE MANAGEMENT

BACKGROUND

The present invention relates generally to the field of data processing, and more particularly to digital twin enabled asset performance and upgrade management.

A digital twin is a virtual representation of a physical object or system across its lifecycle. It uses real-time data and other sources to enable learning, reasoning, and dynamically recalibrating for improved decision making. Simply, this means creating a highly complex virtual model that is the exact counterpart (or twin) of a physical thing. The 'thing' could be a car, a tunnel, a bridge, or even a jet engine. Connected sensors on the physical asset collect data that can be mapped onto the virtual model. By viewing the digital twin, a user can now see crucial information about how the physical thing is operating in the real world.

Asset performance management (APM) is a collection of software tools and applications designed to improve the reliability and availability of physical assets (such as plants, systems of equipment, and infrastructure) essential to the operation of an enterprise. APM encompasses the capabilities of data capture, integration, visualization, and analytics tied together for the explicit purpose of improving the reliability and availability of physical assets. APM systems act to improve the reliability and availability of physical assets while minimizing risk and operating costs. APM typically includes condition monitoring, predictive maintenance, asset integrity management, reliability-centered maintenance, and often involves technologies such as asset health data collection, visualization, and analytics.

SUMMARY

Embodiments of the present invention disclose a method, a computer program product, and a system for digital twin enabled asset performance and upgrade management. In one embodiment, upcoming changes for assets are received, where the upcoming changes include at least one of hardware requirements, firmware requirements, software requirements, hardware upgrades, firmware upgrades, and software upgrades. The upcoming changes for the assets are stored into repositories, where the appropriate repository is determined using topic modeling. The digital twins are updated, where each digital twin is continuously updated with the upcoming changes. Continued usage metrics are calculated for each asset based on the output of the digital twins, where the continued usage metrics are specific to each asset. A report is created based on the upcoming changes and the continued usage metrics, where the report includes at least one of hardware dependencies, firmware dependencies, software dependencies, and upgrade dependencies.

DETAILED DESCRIPTION

Figure 1:
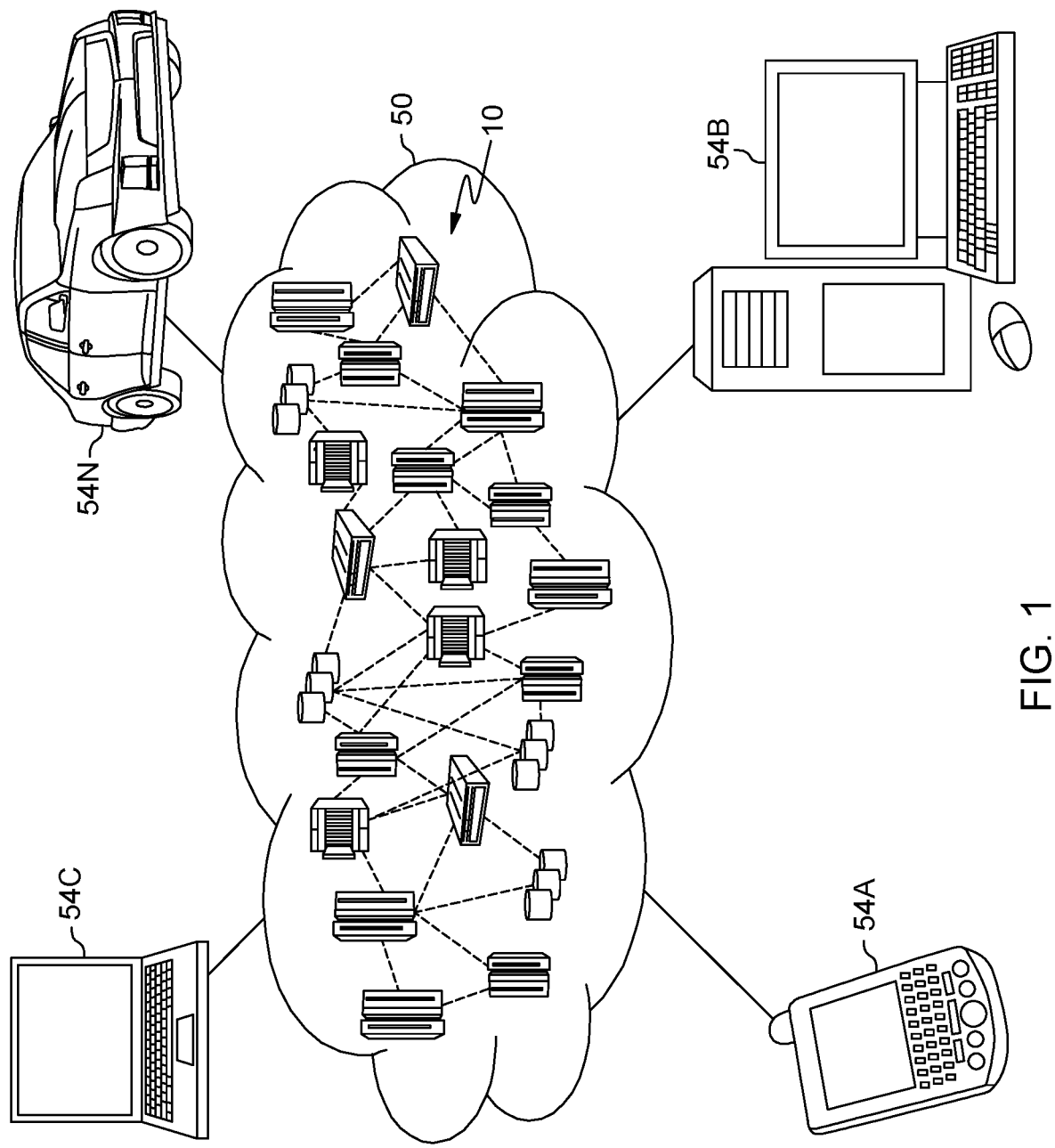
FIG. 1 depicts a cloud computing environment according to an embodiment of the present invention.

Often after the latest release of an application from a vendor, the application is no longer supported on the system. Another scenario occurs when the hardware or system vendor updates the operating system or other firmware/hardware updates, and the applications become obsolete. In the case of large enterprises, who invest large amounts of money to acquire licenses for such applications, when the applications become obsolete due to a specific software or firmware update by the operating system the enterprise often tries to find alternate applications. To stay within the project budget, these alternate applications may include open source software, as it is not always feasible to procure new software or to upgrade to new hardware in the middle of project. The operating system providers typically will not take on the task of supporting the many applications users install on the operating system, so the users are left to support the applications themselves.

For example, a recent upgrade by to a popular computer platform removed support for all 32-bit applications. This required all users of that particular platform to upgrade all applications to 64-bit, if such a version was available. Many users were not aware of this change, and the upgrade caused these systems to fail.

A digital twin is a virtual model of a process, product, or service. This pairing of the virtual and physical worlds allows analysis of data and monitoring of systems to head off problems before they even occur, prevent downtime, develop new opportunities, and even plan for the future by using simulations. For example, a digital twin of an Internet of Things (IoT) device provides both the elements and the dynamics of how the device operates and lives throughout its life cycle.

There are a number of systems for asset management and lifecycle management, but none of the current art utilizes digital twin technology to improve on asset lifecycle management by monitoring upcoming hardware/firmware changes and software dependencies in real time. The present invention ensures that asset management, as well as for infrastructure as a service, platform as a service, software as a service, and cloud service providers will be handled proactively for an organization with the help of digital twin updated reports.

The present invention uses digital twin technology to create a virtual hardware replica of an asset with upcoming hardware/firmware changes and software dependencies as input. In the context of this invention, upcoming changes are those which have been announced, but have not yet been implemented by the user. The invention will evaluate these upcoming changes prior to implementation to determine the effects of the upcoming changes on the systems as deployed by the user. The continuous feed of the upcoming hardware/firmware changes and software dependencies will be provided to the digital twins, which will generate reports containing changes and mapping of the hardware and software dependencies.

In an embodiment, the present invention has the capability to automatically simulate the upcoming changes in the hardware or firmware sources on the physical systems using digital twins and thereby automatically generate a list of software that is dependent on the hardware or firmware sources that will be obsolete based on the upcoming changes. In an embodiment, the present invention will create simulations of different version upgrades of the software or future releases of the software and map to the hardware or firmware changes identified for future releases to automatically create a list of application software that can adapt to the changing dimensions of the technology in terms of hardware and firmware upgrades.

In an embodiment, the present invention will automatically notify the respective procurement teams by classifying all the software that will be obsolete and the alternate software, including open source software, that is potentially a replacement for the obsolete software, based on the hardware or firmware changes. In an embodiment, the present invention will then create suitability metrics by simulation on the digital twins to display the closest match to the obsolete software to allow project planning accordingly.

In an embodiment, the present invention will use IoT feeds received from various systems, including server usage metrics and other external and internal data feeds from multiple sources, to simulate their effect on the system for every potential hardware or firmware change found. This will proactively help asset management teams make informed decisions.

In an example of one possible use case, a smart city with multiple IoT sensors deployed across the city to obtain traffic information requires firmware for each of the interdependent IoT sensors. If an upcoming change is detected in the IoT firmware, the present invention will be able to simulate the effects of the firmware update and prepare the administration beforehand. This can potentially avoid a system-wide shut down if the firmware upgrade has unexpected results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
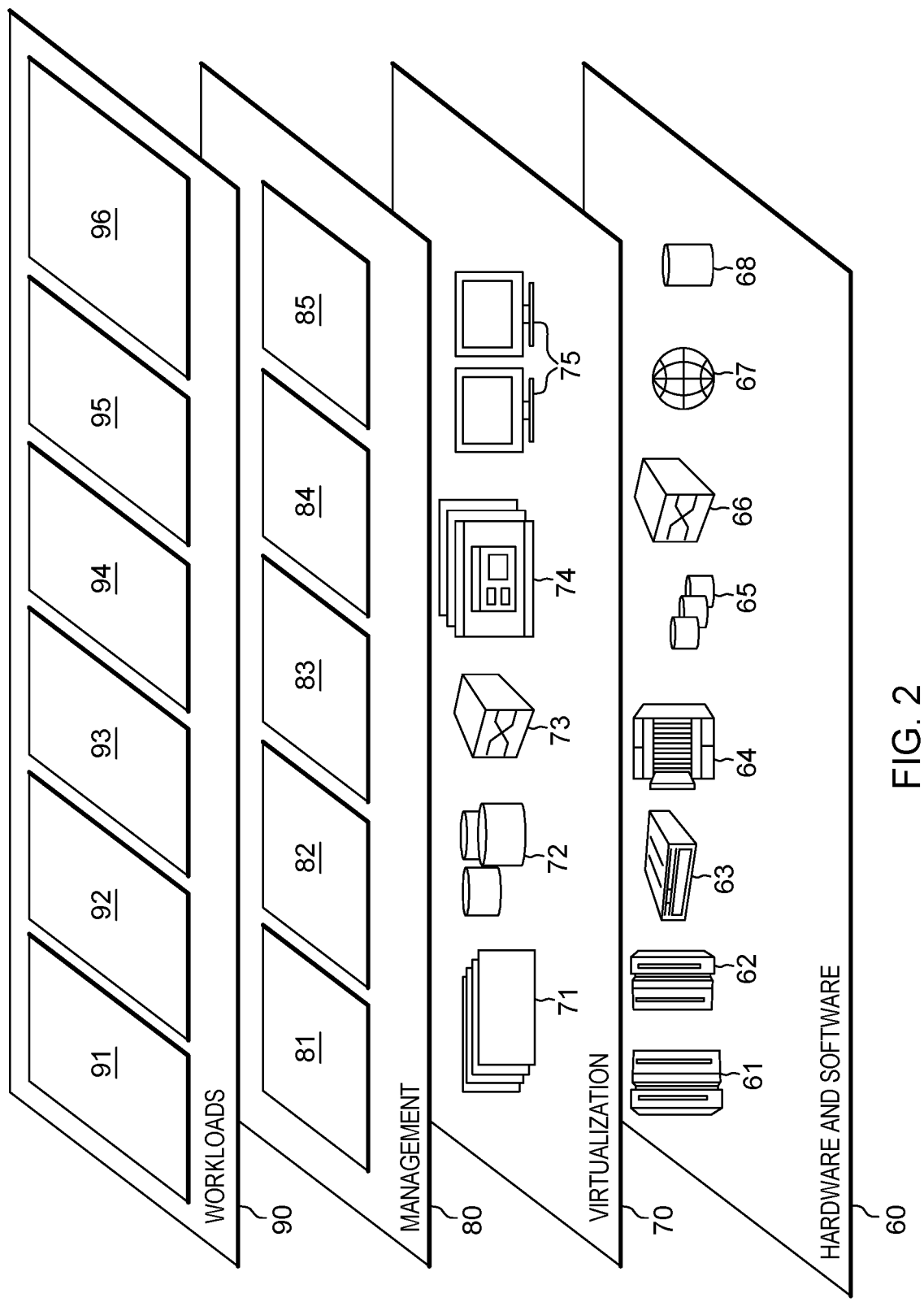
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital twin upgrade management 96.

Figure 3:
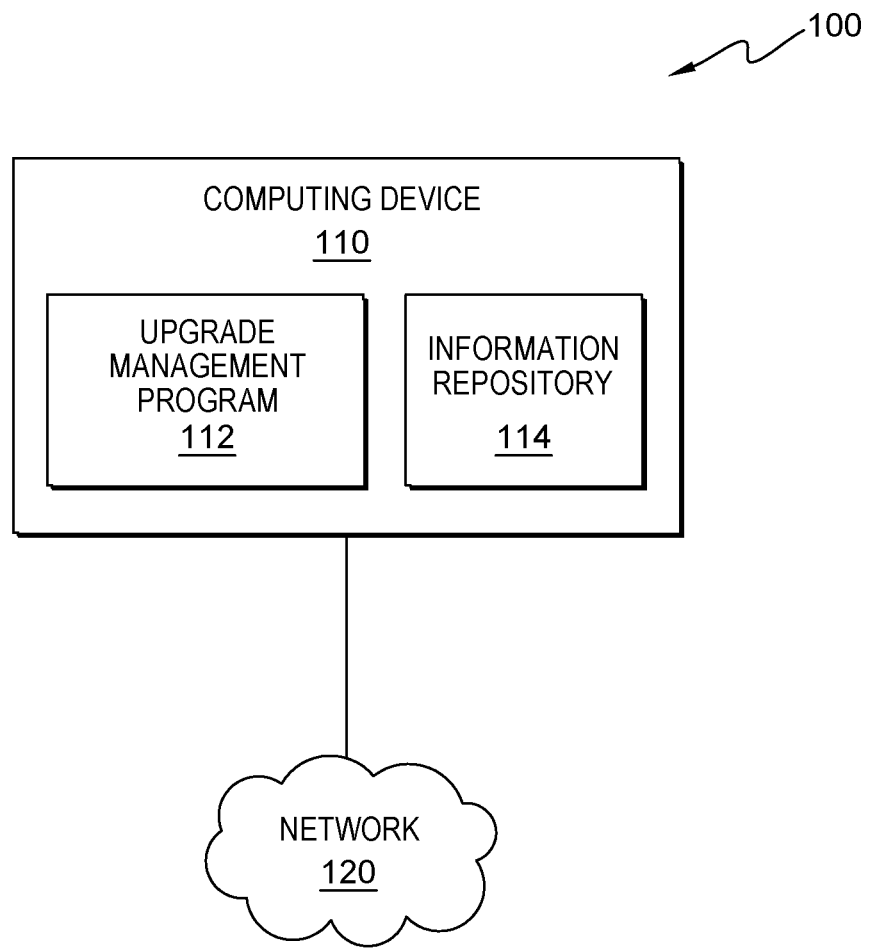
FIG. 3 is a functional block diagram illustrating a distributed data processing environment, in accordance with an embodiment of the present invention.

FIG. 3 is a functional block diagram illustrating a distributed data processing environment, generally designated 100, suitable for operation of upgrade management program 112 in accordance with at least one embodiment of the present invention. The term "distributed" as used herein describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes upgrade management program 112. In an embodiment, upgrade management program 112 is a program, application, or subprogram of a larger program for digital twin enabled asset performance and upgrade management. In an alternative embodiment, upgrade management program 112 may be located on any other device accessible by computing device 110 via network 120.

In an embodiment, computing device 110 includes information repository 114. In an embodiment, information repository 114 may be managed by upgrade management program 112. In an alternate embodiment, information repository 114 may be managed by the operating system of the device, alone, or together with, upgrade management program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, update data, upgrade data, digital twin data, system data, user data, and other data that is received by upgrade management program 112 from one or more sources, and data that is created by upgrade management program 112.

In an embodiment, information repository 114 may also contain a digital twin repository. In an embodiment, the digital twin repository may be separate from information repository 114, provided that the digital twin repository is accessible by computing device 110.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more tables.

Figure 4:
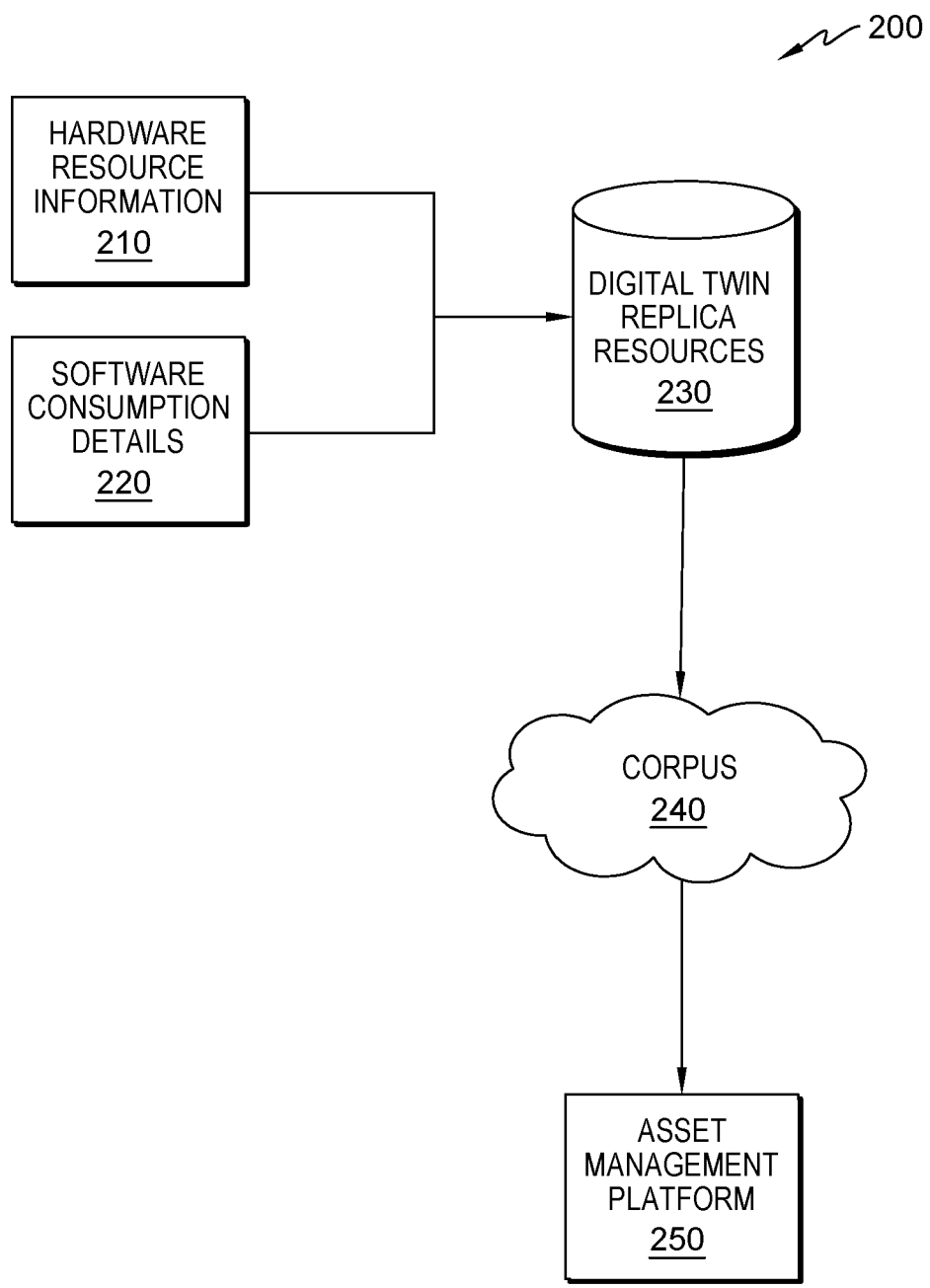
FIG. 4 is an example of the system architecture in accordance with an embodiment of the present invention.

FIG. 4 is one example of a possible system architecture, generally designated 200, in accordance with an embodiment of the present invention. System architecture 200 includes hardware resource information 210 and software consumption details 220, which represent the data input into the digital twin of the asset being managed. System architecture 200 also includes digital twin replica resources 230, which is the digital twin of the asset to be managed. Corpus 240 is an information corpus that contains information about upcoming dependencies changes, which have been acquired from various sources, as discussed below. The result of the analysis also contains the suggestion to asset management platform 250 of changes in software configuration, hardware assets, and firmware configuration to manage the dependency changes. The results of the analysis of the upcoming dependencies changes is output to asset management platform 250.

Figure 5:
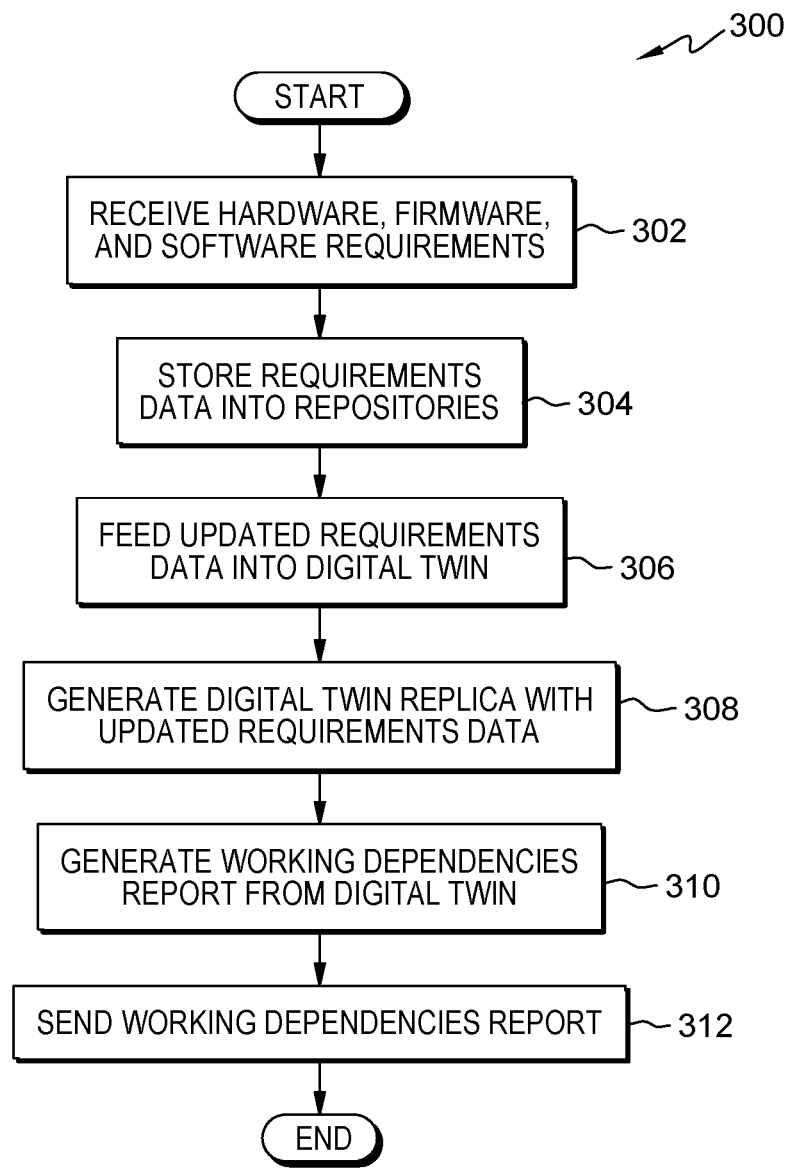
FIG. 5 is a flowchart depicting operational steps of the upgrade management program, on a computing device within the distributed data processing environment of FIG. 3, for digital twin enabled asset performance and upgrade management, in accordance with an embodiment of the present invention.

FIG. 5 is a flowchart depicting operational steps of upgrade management program 112, generally designated workflow 300, on a computing device within the distributed data processing environment of FIG. 3, for digital twin enabled asset performance and upgrade management, in accordance with an embodiment of the present invention. In an alternative embodiment, the steps of workflow 300 may be performed by any other program while working with upgrade management program 112. In an embodiment, upgrade management program 112 receives an entry of any upcoming hardware, software, or firmware requirements for the organization. In an embodiment, based on the results of the discovery mechanism, upgrade management program 112 stores the information received in step 302 into appropriate repositories for hardware, firmware, and software. In an embodiment, upgrade management program 112 feeds the data stored into the digital twin to generate a replica with the updated hardware and software details. In an embodiment, upgrade management program 112 continuously updates the digital twin with changes in hardware, firmware, and software, based on inputs into the system. In an embodiment, once the digital twins resources are up to date with the latest hardware and software information, upgrade management program 112 generates a report detailing the working dependencies and non-working dependencies as well hardware asset dependencies that will be provided to any software and hardware asset management platform. In an embodiment, upgrade management program 112 sends the report to the user.

It should be appreciated that embodiments of the present invention provide at least for digital twin enabled asset performance and upgrade management. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Upgrade management program 112 receives hardware, firmware, and software requirements (step 302). In an embodiment, upgrade management program 112 receives an entry of any upcoming hardware, software, or firmware requirements for the organization. These entries also include any upgrades to existing assets in the organization. In an embodiment, upgrade management program 112 also receives data continuously from various sources, including communication on upcoming systems, which may be publicly available information or vendor exposed data from current vendors, or data that is collected by existing technologies such as web crawlers. In an embodiment, upgrade management program 112 receives relevant data from various sites, for example, vendor sites, vendor news feeds, historical data, IoT feeds, social media feeds, etc. In an embodiment, upgrade management program 112 receives feeds from various systems that include server usage metrics. In an embodiment, upgrade management program 112 uses topic modeling to create a dataset by pre-processing the data and applying filters on the discovered content. In an embodiment, upgrade management program 112 performs the topic modeling on unlabeled data received based on organization information technology administrative needs. After this clustering is performed, the result is a labelled data set called a classification.

In an embodiment, the relevant data received by upgrade management program 112 includes usage metrics that are specific to the usage of an asset, i.e., hardware, software, or firmware, for a specific project by location or business unit. In an embodiment, the usage metrics are configurable for the specific asset as high, low, or used selectively based on the frequency of usage, to enable information technology administrators to prepare by giving them information on the severity of the impact on that asset.

Upgrade management program 112 stores requirements data into repositories (step 304). In an embodiment, based on the results of the discovery mechanism performed in step 302, upgrade management program 112 stores the information received in step 302 into appropriate repositories for hardware, e.g., hardware resource information 210 from FIG. 2, firmware, and software, e.g., software consumption details 220 from FIG. 2. Upgrade management program 112 uses the topic modeling performed in step 302 to index the data to determine the appropriate repositories in which to store the requirements data.

Upgrade management program 112 feeds updated requirements data into the digital twin (step 306). In an embodiment, upgrade management program 112 feeds the data stored in step 304 into the digital twin, e.g., digital twin replica resources 230 from FIG. 2, to generate a replica with the updated hardware and software details.

Upgrade management program 112 generates a digital twin replica with updated requirements data (step 308). In an embodiment, upgrade management program 112 continuously updates the digital twin with changes in hardware, firmware, and software, based on inputs into the system. In various embodiments, these inputs may include the hardware resource model, changes in the CPU architecture, changes in the memory architecture, functional changes into the hardware architecture, design changes, CPU speed and core architecture changes, software consumption details, software nonfunctional requirements details, and the current working scenario and mapping details with the hardware resources.

In an embodiment, the hardware resource model is the actual new hardware resource related information that is to be fed into digital twin model to create a virtual replica. For example, a digital twin simulation for a facility will consider the physical assets inside the facility such as servers, computers, cabling, etc., which can help in arriving at base model or repository of different types of systems or machines in the facility. Alternatively, based on the type of project, the system can propose different type of challenges that can occur which are also simulated using the digital twin. In an embodiment, the functional changes into the hardware architecture refers to any changes into hardware access, such as providing more security, more read/write access, or 110 operational changes on hardware. In an embodiment, the CPU speed and core architecture changes include changes in CPU core speed, e.g., 2.3 GHz to 3.2 GHz, or changes in core architecture, such as changing from a 32-bit core to a 64-bit core.

In an embodiment, the software consumption details is data from the repositories that was gathered in step 304 that is the input into the digital twin to generate the software dependency metrics. In an embodiment, the software nonfunctional requirements details define system attributes such as security, reliability, performance, maintainability, scalability, and usability that are requirements for executing the software, but not requirements for the functioning of the software. For example, a software appliance that is designed to run on a system with a resource sharing feature enabled that is changed to run on a new server with different hardware or firmware upgrade changes to that feature, e.g., higher security, can break the appliance working behavior. Even though the change does not affect the software functionality, it may prevent the software from executing.

In an embodiment, the current working scenario and mapping details with the hardware resources are a measure of how well the software works with the current hardware resources and their working scenarios.

In an embodiment, upgrade management program 112 calculates continued usage metrics for the assets based on the usage metrics and updates to hardware, firmware, and software received in step 302.

Upgrade management program 112 generates a working dependencies report from the digital twin (step 310). In an embodiment, once the digital twins resources are updated with the latest hardware and software information in step 308, upgrade management program 112 generates a report detailing the working dependencies and non-working dependencies as well hardware asset dependencies (e.g., USB mouse not working with USB 2.0 adapter) that will be provided to any software and hardware asset management platform, e.g., asset management platform 250 from FIG. 2. In an embodiment, the reports generated will be used to tag the asset for more usable and non-usable items based on future technology changes. In an embodiment, upgrade management program 112 creates new asset requirements and includes them in the report. In an embodiment, upgrade management program 112 includes the continued usage metrics for the assets calculated in step 302 into the working dependencies report. In an embodiment, upgrade management program 112 includes a list of assets that will become obsolete based on the upcoming changes to hardware, firmware, or software. In an embodiment, upgrade management program 112 includes a list of software upgrades that are compatible with the upcoming hardware or firmware changes. In an embodiment, upgrade management program 112 includes in the report the resolutions found by the various feeds received in step 302 and makes suggestions to the project unit that allow the software application to accommodate config changes.

In an embodiment, upgrade management program 112 uses the various data feeds that it receives to create a corpus of available alternate software products, including open source software. In an embodiment, upgrade management program 112 uses a corpus, e.g., corpus 240 from FIG. 2, and the results of the digital twin simulations to determine any alternate software, including open source software, that is potentially a replacement for the obsolete software based on the hardware or firmware changes. In an embodiment, upgrade management program 112 simulates the alternate software to determine if it is compatible with the hardware and firmware changes. In an embodiment, if upgrade management program 112 determines that the alternate software is compatible with the hardware and firmware changes, then upgrade management program 112 creates suitability metrics for the alternate software by simulation on the digital twins to display the alternate software, including open source software, that is the closest match to the obsolete software. In an embodiment, the APM system uses these suitability metrics to perform project planning accordingly.

Upgrade management program 112 sends a working dependencies report (step 312). In an embodiment, upgrade management program 112 inputs the report directly into an APM system. In an embodiment, upgrade management program 112 interfaces with the APM tools to create recommendations based on the reports. For example, the report may indicate that a new hardware upgrade will make certain keyboards obsolete, but the APM system finds that those keyboards can be used by another division. In an embodiment, these recommendations allow the APM system to proactively procure or replace the software or hardware components that will become obsolete by the upcoming changes. In another embodiment, upgrade management program 112 sends the report created in step 310 directly to the user. Upgrade management program 112 then ends for this cycle.

Figure 6:
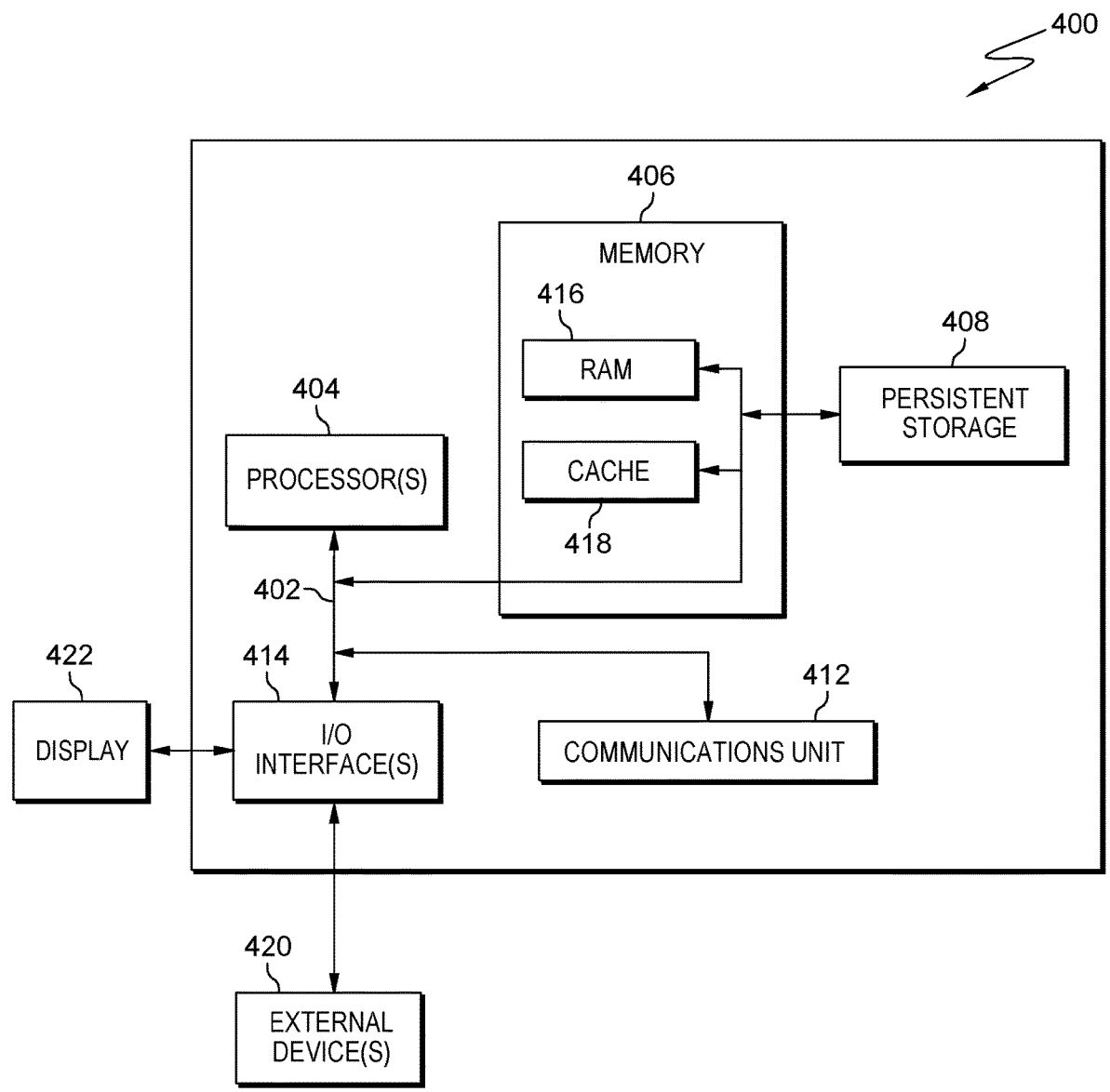
FIG. 6 depicts a block diagram of components of the computing device executing the upgrade management program within the distributed data processing environment of FIG. 3, in accordance with an embodiment of the present invention.

FIG. 6 is a block diagram depicting components of computing device 110 suitable for upgrade management program 112, in accordance with at least one embodiment of the invention. FIG. 6 displays computer 400; one or more processor(s) 404 (including one or more computer processors); communications fabric 402; memory 406, including random-access memory (RAM) 416 and cache 418; persistent storage 408; communications unit 412; I/O interfaces 414; display 422; and external devices 420. It should be appreciated that FIG. 6 provides only an illustration of one embodiment and does not imply any limitations with regard to the environments in which different embodiments may be implemented. Many modifications to the depicted environment may be made.

As depicted, computer 400 operates over communications fabric 402, which provides communications between computer processor(s) 404, memory 406, persistent storage 408, communications unit 412, and I/O interface(s) 414. Communications fabric 402 may be implemented with any architecture suitable for passing data or control information between processors 404 (e.g., microprocessors, communications processors, and network processors), memory 406, external devices 420, and any other hardware components within a system. For example, communications fabric 402 may be implemented with one or more buses.

Memory 406 and persistent storage 408 are computer readable storage media. In the depicted embodiment, memory 406 comprises RAM 416 and cache 418. In general, memory 406 can include any suitable volatile or non-volatile computer readable storage media. Cache 418 is a fast memory that enhances the performance of processor(s) 404 by holding recently accessed data, and near recently accessed data, from RAM 416.

Program instructions for upgrade management program 112 may be stored in persistent storage 408, or more generally, any computer readable storage media, for execution by one or more of the respective computer processors 404 via one or more memories of memory 406. Persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. In the context of some embodiments of the present invention, the source of the various input data may be physically remote to computer 400 such that the input data may be received, and the output similarly transmitted via communications unit 412.

I/O interface(s) 414 allows for input and output of data with other devices that may be connected to computer 400. For example, I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., upgrade management program 112, can be stored on such portable computer readable storage media and can be loaded onto persistent storage 408 via I/O interface(s) 414. I/O interface(s) 414 also connect to display 422.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for digital twin based asset management, the computer-implemented method comprising:
    receiving, by one or more computer processors, one or more upcoming changes for one or more assets, wherein the one or more upcoming changes for the one or more assets include at least one of one or more hardware requirements, one or more firmware requirements, one or more software requirements, one or more hardware upgrades, one or more firmware upgrades, and one or more software upgrades;
    storing, by the one or more computer processors, the one or more upcoming changes for the one or more assets into one or more repositories, wherein an appropriate repository of the one or more repositories is determined using topic modeling;
    updating, by the one or more computer processors, one or more digital twins, wherein each digital twin of the one or more digital twins is a virtual hardware replica of an asset, and further wherein each digital twin of the one or more digital twins is continuously updated with the one or more upcoming changes in the one or more repositories;
    calculating, by the one or more computer processors, a continued usage metrics for each asset of the one or more assets based on an output of the one or more digital twins, wherein the continued usage metrics are specific to each asset of the one or more assets; and
    creating, by the one or more computer processors, a first report based on the one or more upcoming changes and the continued usage metrics, wherein the first report includes at least one of hardware dependencies, firmware dependencies, software dependencies, and upgrade dependencies.

2. The computer-implemented method of claim 1, wherein the first report includes a list of any asset of the one or more assets that will be obsolete based on the one or more upcoming changes and the output of the one or more digital twins.

3. The computer-implemented method of claim 1, wherein calculating the continued usage metrics for each asset of the one or more assets based on the output of the one or more digital twins, wherein the continued usage metrics are specific to each asset of the one or more assets further comprises:

mapping, by the one or more computer processors, the one or more software upgrades to the one or more hardware upgrades and the one or more firmware upgrades for each asset of the one or more assets;

determining, by the one or more computer processors, whether the one or more software upgrades are compatible with the one or more hardware upgrades and the one or more firmware upgrades for each asset of the one or more assets; and creating, by the one or more computer processors, a list of each software upgrade of the one or more software upgrades that is compatible with the one or more hardware upgrades and the one or more firmware upgrades for each asset of the one or more assets.

4. The computer-implemented method of claim 1, wherein calculating the continued usage metrics for each asset of the one or more assets based on the output of the one or more digital twins, wherein the continued usage metrics are specific to each asset of the one or more assets further comprises:

mapping, by the one or more computer processors, each software upgrade of the one or more software upgrades to the one or more hardware upgrades and the one or more firmware upgrades for each asset of the one or more assets;

creating, by the one or more computer processors, a list of each software upgrade of the one or more software upgrades that is not compatible with the one or more hardware upgrades and the one or more firmware upgrades; and responsive to determining whether one or more alternate software are compatible with the one or more hardware upgrades and the one or more firmware upgrades for each asset of the one or more assets, creating, by the one or more computer processors, a list of each alternate software of the one or more alternate software that is compatible with the one or more hardware upgrades and the one or more firmware upgrades, wherein each alternate software of the one or more alternate software is a potential replacement for the one or more software upgrades.

5. The computer-implemented method of claim 1, wherein calculating the continued usage metrics for each asset of the one or more assets based on the output of the one or more digital twins, wherein the continued usage metrics are specific to each asset of the one or more assets further comprises:

receiving, by the one or more computer processors, one or more server usage metrics;

simulating, by the one or more computer processors, the one or more server usage metrics and the one or more upcoming changes for the one or more assets on the one or more digital twins; and creating, by the one or more computer processors, a second report, wherein the second report is a list of an effect of the one or more upcoming changes on each server usage metrics of the one or more server usage metrics for each asset of the one or more assets.

6. The computer-implemented method of claim 1, wherein the one or more upcoming changes for the one or more assets are received from at least one of publicly available information feeds, vendor exposed data sites, web crawler data, vendor news feeds, historical data, internet of things data, social media data feeds, and server metric data feeds.

7. The computer-implemented method of claim 1, further comprising sending, by the one or more computer processors, the first report to an asset performance management system.

8. A computer program product for digital twin based asset management, the computer program product comprising:

one or more computer readable storage media and program instructions stored on the one or more computer readable storage media, the stored program instructions comprising instructions to:

receive one or more upcoming changes for one or more assets, wherein the one or more upcoming changes for the one or more assets include at least one of one or more hardware requirements, one or more firmware requirements, one or more software requirements, one or more hardware upgrades, one or more firmware upgrades, and one or more software upgrades;

store the one or more upcoming changes for the one or more assets into one or more repositories, wherein an appropriate repository of the one or more repositories is determined using topic modeling;

update one or more digital twins, wherein each digital twin of the one or more digital twins is a virtual hardware replica of an asset, and further wherein each digital twin of the one or more digital twins is continuously updated with the one or more upcoming changes in the one or more repositories;

calculate a continued usage metrics for each asset of the one or more assets based on an output of the one or more digital twins, wherein the continued usage metrics are specific to each asset of the one or more assets; and create a first report based on the one or more upcoming changes and the continued usage metrics, wherein the first report includes at least one of hardware dependencies, firmware dependencies, software dependencies, and upgrade dependencies.

9. The computer program product of claim 8, wherein the first report includes a list of any asset of the one or more assets that will be obsolete based on the one or more upcoming changes and the output of the one or more digital twins.

10. The computer program product of claim 8, wherein calculate the continued usage metrics for each asset of the one or more assets based on the output of the one or more digital twins, wherein the continued usage metrics are specific to each asset of the one or more assets further comprises one or more of the following program instructions, stored on the one or more computer readable storage media, to:

map the one or more software upgrades to the one or more hardware upgrades and the one or more firmware upgrades for each asset of the one or more assets;

determine whether the one or more software upgrades are compatible with the one or more hardware upgrades and the one or more firmware upgrades for each asset of the one or more assets; and create a list of each software upgrade of the one or more software upgrades that is compatible with the one or more hardware upgrades and the one or more firmware upgrades for each asset of the one or more assets.

11. The computer program product of claim 8, wherein calculate the continued usage metrics for each asset of the one or more assets based on the output of the one or more digital twins, wherein the continued usage metrics are specific to each asset of the one or more assets further comprises one or more of the following program instructions, stored on the one or more computer readable storage media, to:
- map each software upgrade of the one or more software upgrades to the one or more hardware upgrades and the one or more firmware upgrades for each asset of the one or more assets;
- create a list of each software upgrade of the one or more software upgrades that is not compatible with the one or more hardware upgrades and the one or more firmware upgrades; and
- responsive to determining whether one or more alternate software are compatible with the one or more hardware upgrades and the one or more firmware upgrades for each asset of the one or more assets, create a list of each alternate software of the one or more alternate software that is compatible with the one or more hardware upgrades and the one or more firmware upgrades, wherein each alternate software of the one or more alternate software is a potential replacement for the one or more software upgrades.

12. The computer program product of claim 8, wherein calculate the continued usage metrics for each asset of the one or more assets based on the output of the one or more digital twins, wherein the continued usage metrics are specific to each asset of the one or more assets further comprises one or more of the following program instructions, stored on the one or more computer readable storage media, to:
- receive one or more server usage metrics;
- simulate the one or more server usage metrics and the one or more upcoming changes for the one or more assets on the one or more digital twins; and
- create a second report, wherein the second report is a list of an effect of the one or more upcoming changes on each server usage metrics of the one or more server usage metrics for each asset of the one or more assets.

13. The computer program product of claim 8, wherein the one or more upcoming changes for the one or more assets are received from at least one of publicly available information feeds, vendor exposed data sites, web crawler data, vendor news feeds, historical data, internet of things data, social media data feeds, and server metric data feeds.

14. The computer program product of claim 8, further comprising one or more of the following program instructions, stored on the one or more computer readable storage media, to send the first report to an asset performance management system.

15. A computer system for digital twin based asset management, the computer system comprising:
- one or more computer processors;
- one or more computer readable storage media; and
- program instructions stored on the one or more computer readable storage media for execution by at least one of the one or more computer processors, the stored program instructions comprising instructions to:
  - receive one or more upcoming changes for one or more assets, wherein the one or more upcoming changes for the one or more assets include at least one of one or more hardware requirements, one or more firmware requirements, one or more software requirements, one or more hardware upgrades, one or more firmware upgrades, and one or more software upgrades;
  - store the one or more upcoming changes for the one or more assets into one or more repositories, wherein an appropriate repository of the one or more repositories is determined using topic modeling;
  - update one or more digital twins, wherein each digital twin of the one or more digital twins is a virtual hardware replica of an asset, and further wherein each digital twin of the one or more digital twins is continuously updated with the one or more upcoming changes in the one or more repositories;
  - calculate a continued usage metrics for each asset of the one or more assets based on an output of the one or more digital twins, wherein the continued usage metrics are specific to each asset of the one or more assets; and
  - create a first report based on the one or more upcoming changes and the continued usage metrics, wherein the first report includes at least one of hardware dependencies, firmware dependencies, software dependencies, and upgrade dependencies.

16. The computer system of claim 15, wherein the first report includes a list of any asset of the one or more assets that will be obsolete based on the one or more upcoming changes and the output of the one or more digital twins.

17. The computer system of claim 15, wherein calculate the continued usage metrics for each asset of the one or more assets based on the output of the one or more digital twins, wherein the continued usage metrics are specific to each asset of the one or more assets further comprises one or more of the following program instructions, stored on the one or more computer readable storage media, to:
- map the one or more software upgrades to the one or more hardware upgrades and the one or more firmware upgrades for each asset of the one or more assets;
- determine whether the one or more software upgrades are compatible with the one or more hardware upgrades and the one or more firmware upgrades for each asset of the one or more assets; and
- create a list of each software upgrade of the one or more software upgrades that is compatible with the one or more hardware upgrades and the one or more firmware upgrades for each asset of the one or more assets.

18. The computer system of claim 15, wherein calculate the continued usage metrics for each asset of the one or more assets based on the output of the one or more digital twins, wherein the continued usage metrics are specific to each asset of the one or more assets further comprises one or more of the following program instructions, stored on the one or more computer readable storage media, to:
- map each software upgrade of the one or more software upgrades to the one or more hardware upgrades and the one or more firmware upgrades for each asset of the one or more assets;
- create a list of each software upgrade of the one or more software upgrades that is not compatible with the one or more hardware upgrades and the one or more firmware upgrades; and
- responsive to determining whether one or more alternate software are compatible with the one or more hardware upgrades and the one or more firmware upgrades for each asset of the one or more assets, create a list of each alternate software of the one or more alternate software that is compatible with the one or more hardware upgrades and the one or more firmware upgrades, wherein each alternate software of the one or more alternate software is a potential replacement for the one or more software upgrades.

19. The computer system of claim 15, wherein calculate the continued usage metrics for each asset of the one or more assets based on the output of the one or more digital twins, wherein the continued usage metrics are specific to each asset of the one or more assets further comprises one or more of the following program instructions, stored on the one or more computer readable storage media, to:
   receive one or more server usage metrics;
   simulate the one or more server usage metrics and the one or more upcoming changes for the one or more assets on the one or more digital twins; and
   create a second report, wherein the second report is a list of an effect of the one or more upcoming changes on each server usage metrics of the one or more server usage metrics for each asset of the one or more assets.

20. The computer system of claim 15, wherein the one or more upcoming changes for the one or more assets are received from at least one of publicly available information feeds, vendor exposed data sites, web crawler data, vendor news feeds, historical data, internet of things data, social media data feeds, and server metric data feeds.

* * * * *